(12) United States Patent
Cui et al.

(10) Patent No.: US 11,561,881 B2
(45) Date of Patent: Jan. 24, 2023

(54) OUT-OF-DATE RUNBOOK DETECTION

(71) Applicant: International Business Machines Corporation, Armonk, NY (US)

(72) Inventors: Xin Cui, Beijing (CN); Zhong Shi Wang, Beijing (CN); Chang Zhi G Z Zhang, Beijing (CN); Li Gu, Beijing (CN); Li Wen, Beijing (CN); Guang Yi Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 17/173,992

(22) Filed: Apr. 22, 2021

(65) Prior Publication Data

US 2022/0342796 A1 Oct. 27, 2022

(51) Int. Cl.
*G06F 11/36* (2006.01)
*G06F 16/23* (2019.01)

(52) U.S. Cl.
CPC ...... *G06F 11/3612* (2013.01); *G06F 16/2379* (2019.01)

(58) Field of Classification Search
None
See application file for complete search history.

(56) References Cited

U.S. PATENT DOCUMENTS

| | | | | |
|---|---|---|---|---|
| 8,112,710 B2 * | 2/2012 | Cheng | .................. | G06F 3/0481 715/709 |
| 8,533,608 B1 * | 9/2013 | Tantiprasut | ............ | G06Q 10/06 715/751 |
| 10,284,437 B2 * | 5/2019 | Scallan | ................... | H04L 41/40 |
| 2019/0163594 A1 * | 5/2019 | Hayden | ................. | G06F 11/079 |
| 2019/0391892 A1 * | 12/2019 | Sabharwal | ........... | G06N 3/0454 |
| 2019/0392310 A1 * | 12/2019 | Sabharwal | ............... | G06N 3/08 |
| 2020/0004618 A1 * | 1/2020 | Thornhill | ............ | G06F 11/0769 |

(Continued)

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Isaac Tuku Tecklu
(74) *Attorney, Agent, or Firm* — Grant Johnson

(57) ABSTRACT

A method, system, and computer program product for detecting out-of-date runbooks are disclosed. The method may include generating a defect corresponding to an alert on a running workload system. The method may further include, in response to generating the defect in the running workload system, automatically obtaining an identification of a runbook based on information of the alert, automatically accessing the runbook based on the identification of the runbook, the runbook including instructions for fixing the defect, automatically parsing the instructions to obtain executable operations, and automatically executing the executable operations on the running workload system. The method may further include, in response to detecting that the alert is not solved on the running workload system after a predefined period, automatically determining that the runbook is out-of-date, and automatically generating a runbook out-of-date signal.

17 Claims, 6 Drawing Sheets

(56) References Cited

U.S. PATENT DOCUMENTS

2020/0050444 A1\* 2/2020 Nikam ............... G06F 16/9024
2021/0191769 A1\* 6/2021 Eschinger .......... G06F 11/1464

OTHER PUBLICATIONS

"Game Day," https://wa.aws.amazon.com/wat.concept.gameday.en.html.

Matthew Helmke, "Ensuring Runbooks are Up-to-Date," Oct. 9, 2019, https://www.gremlin.com/blog/ensuring-runbooks-are-up-to-date/.

\* cited by examiner

OUT-OF-DATE RUNBOOK DETECTION

BACKGROUND

The present disclosure generally relates to computing technologies, and more specifically, to a method, system, and computer program product for detecting out-of-date runbooks.

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the higher performance of those capabilities, resulting in computer systems today that are much more powerful than just a few years ago.

This increased capability, however, has led to increasing complexity. As a result, a workload system developed by developers may have defects. The developers may define alerts corresponding to these defects during the developing process, so that when these defects are detected, their corresponding alerts may be triggered to make operators of the workload system aware of these defects. Then, the operators of the workload system may fix the defects.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to embodiments of the present disclosure, there is provided a computer-implemented method. The method may include generating, by one or more processors, a defect corresponding to an alert on a running workload system. The method may further include, in response to generating the defect in the running workload system, automatically obtaining, by the one or more processing units, an identification of a runbook based on information of the alert. The method may further include automatically accessing, by the one or more processing units, the runbook based on the identification of the runbook, the runbook including instructions for fixing the defect. The method may further include automatically parsing, by the one or more processing units, the instructions to obtain executable operations. The method may further include automatically executing, by the one or more processing units, the executable operations on the running workload system. The method may further include, in response to detecting that the alert is not solved on the running workload system after a predefined period: automatically determining, by the one or more processing units, that the runbook is out-of-date, and automatically generating, by the one or more processing units, a runbook out-of-date signal.

According to embodiments of the present disclosure, there is provided a system. The system comprises a first component with at least one processing unit in a cloud computing environment and a memory coupled to the at least one processing unit and storing instructions thereon. The instructions, when executed by the at least one processing unit, cause the processing unit to detect an alert on a running workload system. In response to detecting the alert in the running workload system, the instructions may further cause the processing unit to obtain an identification of a runbook based on information of the alert, access the runbook based on the identification of the runbook, the runbook including contents describing operations for fixing the defect, parse the contents to obtain executable operations, execute the executable operations on the running workload system, and in response to detecting that the alert is not solved on the running workload system after a predefined period, determine that the runbook is out-of-date.

According to embodiments of the present disclosure, there is provided a computer program product comprising a computer-readable storage medium having program instructions embodied therewith. The program instructions are executable by a first component with at least one processing unit in a cloud computing environment to cause the at least one processing unit to perform operations. The operations may include generating a defect corresponding to an alert on a running workload system. The operations may include, in response to generating the defect, obtaining an identification of a runbook based on information of the alert, accessing the runbook based on the identification of the runbook, the runbook including contents describing operations for fixing the defect, parsing the contents to obtain executable operations, executing the executable operations on the running workload system, and in response to detecting that the alert is not solved on the running workload system after a predefined period, determining that the runbook is out-of-date.

BRIEF DESCRIPTION OF THE SEVERAL VIEWS OF THE DRAWINGS

Through the more detailed description of some embodiments of the present disclosure in the accompanying drawings, various features and advantages of the present disclosure will become apparent, wherein the same reference generally refers to the same components in the embodiments of the present disclosure. The various features of the drawings are not to scale as the illustrations are for clarity in facilitating one skilled in the art in understanding the disclosure in conjunction with the detailed description. The drawings are discussed forthwith below.

DETAILED DESCRIPTION

Figure 1:
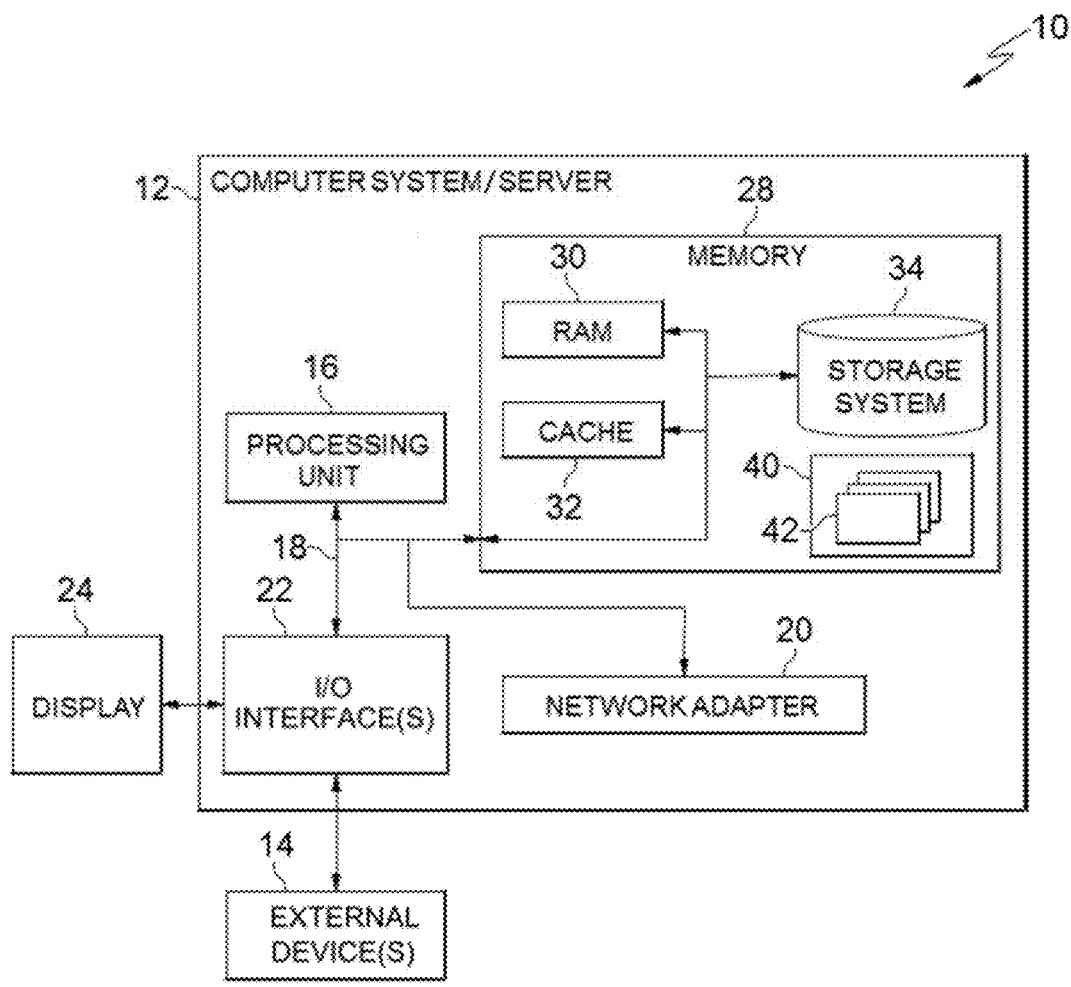
FIG. 1 depicts a cloud computing node according to some embodiments of the present disclosure.

The following description with reference to the accompanying drawings is provided to assist in a comprehensive understanding of embodiments of the invention as defined by the claims and their equivalents. The following description includes various specific details to assist in that understanding, but these are to be regarded as mere examples. Those of ordinary skill in the art will recognize that various changes and modifications of the embodiments described herein can be made without departing from the scope and spirit of the disclosure. In addition, descriptions of well-known functions and constructions may be omitted for clarity and conciseness.

In the following, reference is made to various embodiments of the disclosure. However, it should be understood that the disclosure is not limited to specific described embodiments. Instead, any combination of the following features and elements, whether related to different embodiments or not, are contemplated to implement and practice the various embodiments of the disclosure. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and shall not be considered elements or limitations of the appended claims. Likewise, reference to "the invention" shall not be construed as a generalization of any inventive subject matter disclosed herein and shall not be considered to be an element or limitation of the appended claims.

The terms and words used in the following description and claims are not limited to the bibliographical meanings, but instead, are merely used to enable a clear and consistent understanding of embodiments of the disclosure. Accordingly, it should be apparent to those skilled in the art that the following description of example embodiments is provided for illustration purpose only and not for the purpose of limiting the disclosure.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth herein.

In cloud computing node 10, there may be a computer system/server 12 or a portable electronic device, such as a communication device, that is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, etc. that may perform particular tasks or implement particular abstract data types. Computer system/server 12 may be practiced in distributed cloud computing environments, where tasks may be performed by remote processing devices that are linked through a communications network. In a distributed cloud computing environment, program modules may be located in both local and remote computer system storage media including memory storage devices.

As shown in FIG. 1, computer system/server 12 in cloud computing node 10 may be a general-purpose computing device. The components of computer system/server 12 may include, but are not limited to, one or more processors (and/or processing units) 16, a system memory 28, and a bus 18 that couples various system components including system memory 28 to processor 16.

Bus 18 represents one or more of any of several types of bus structures, including without limitation: a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 may include a variety of computer system readable media. Such media may include tangible computer readable media that is accessible by computer system/server 12, including volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk (e.g., a CD-ROM, DVD-ROM or other optical media) may be included. In such instances, each may be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 may carry out the functions and/or methodologies of embodiments of the disclosure as described herein.

Computer system/server 12 may also communicate with one or more external devices 14, such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks, such as a local area network (LAN), a general wide area network (WAN), and/or a public network (e.g., the Internet) via network adapter 20. As depicted, network adapter 20 may communicate with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
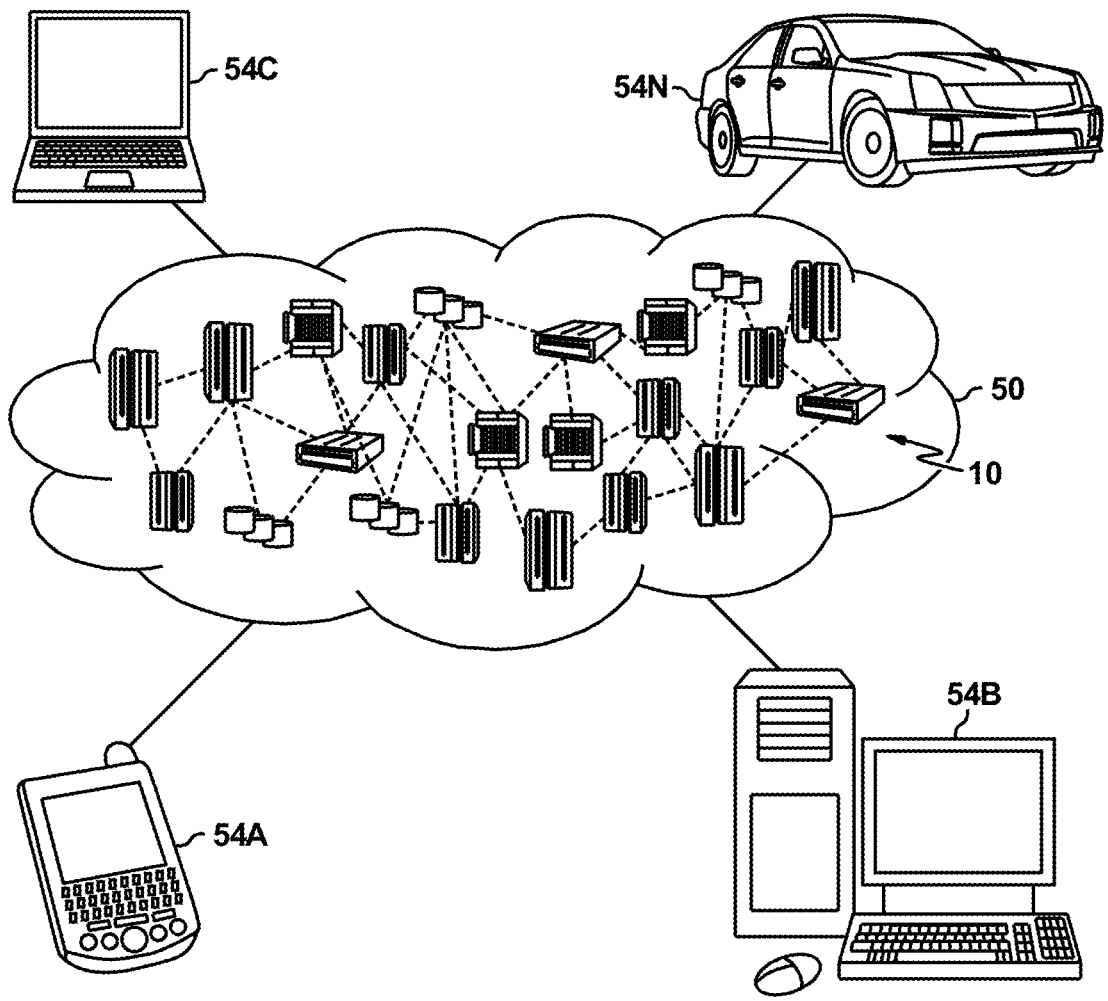
FIG. 2 depicts a cloud computing environment according to some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described above, and/or a combination thereof. This may allow cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 may be able to communicate with any type of computerized device over any type of network and/or network addressable connection (e.g., using a web browser).

Figure 3:
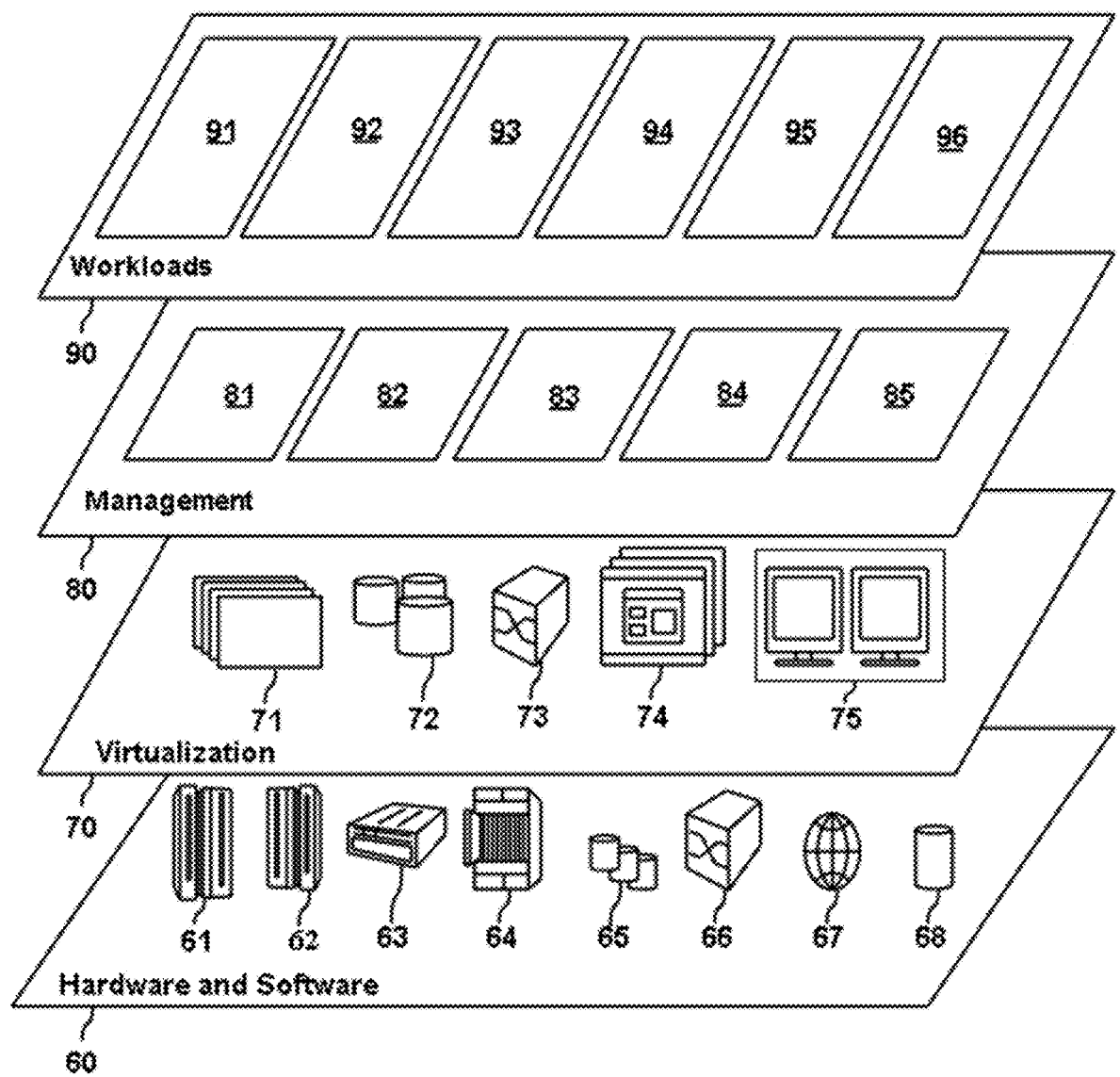
FIG. 3 depicts abstraction model layers according to some embodiments of the present disclosure.

Referring now to FIG. 3, a set of functional abstraction layers provided by cloud computing environment 50 (FIG. 2) is shown. It should be understood, however, that the components, layers, and functions shown in FIG. 3 are intended to be illustrative only, and that embodiments of the disclosure are not limited thereto. As depicted, the following layers and corresponding functions are provided:

Hardware and software layer 60 may include hardware and software components. Examples of hardware components include, without limitation: mainframes 61; RISC (Reduced Instruction Set Computer) architecture based servers 62; servers 63; blade servers 64; storage devices 65; and networks and networking components 66. In some embodiments, software components may include network application server software 67 and database software 68.

Virtualization layer 70 may provide an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 may provide dynamic procurement of computing resources and other resources that may be utilized to perform tasks within the cloud computing environment. Metering and Pricing 82 provide cost tracking as resources are utilized within the cloud computing environment, and billing or invoicing for consumption of these resources. In one example, these resources may include application software licenses. Security (not shown) may provide identity verification for cloud consumers and tasks, as well as protection for data and other resources. User portal 83 may provide access to the cloud computing environment for consumers and system administrators. Service level management 84 may provide cloud computing resource allocation and management such that required service levels are met. Service Level Agreement (SLA) planning and fulfillment 85 may provide pre-arrangement for, and procurement of, cloud computing resources for which a future requirement is anticipated in accordance with an SLA.

Workloads layer 90 may provide examples of functionality for which the cloud computing environment may be utilized. Examples of workloads and functions which may be provided from this layer include, without limitation: mapping and navigation 91; software development and lifecycle management 92; virtual classroom education delivery 93; data analytics processing 94; transaction processing 95; and application processing 96.

A runbook generally refers to a document (or a set of documents) describing how to fix a defect during running of a workload system, how to preform procedures and operations, and/or procedures to debug the workload system. In some embodiments, developers who developed the workload system can predefine an alert for a defect in the workload system, and information about the alert may include an identification (such as a uniform resource locator link, a uniform resource identifier of a database, or other format) of a runbook in which descriptive operations for how to fix the defect are listed. If the defect occurs during the execution/running of the workload system, an operator may find the alert so as to access the runbook using the identification of the runbook included in the information of the alert. The operator may fix the defect according to the descriptive operations included in the runbook.

Figure 4:
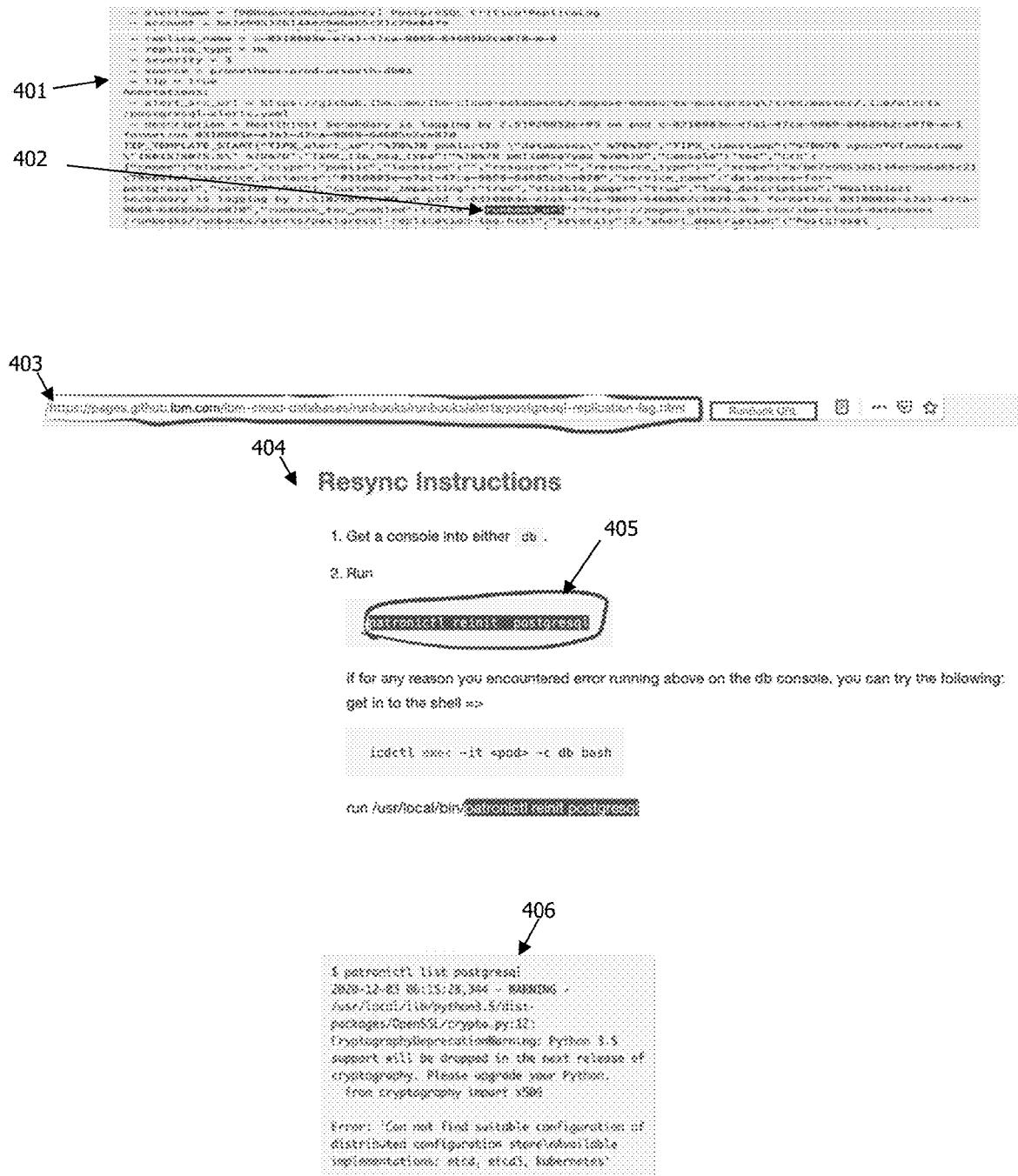
FIG. 4 depicts an example alert in which a link of a runbook is included according to some embodiments of the present disclosure.
Figure 5:
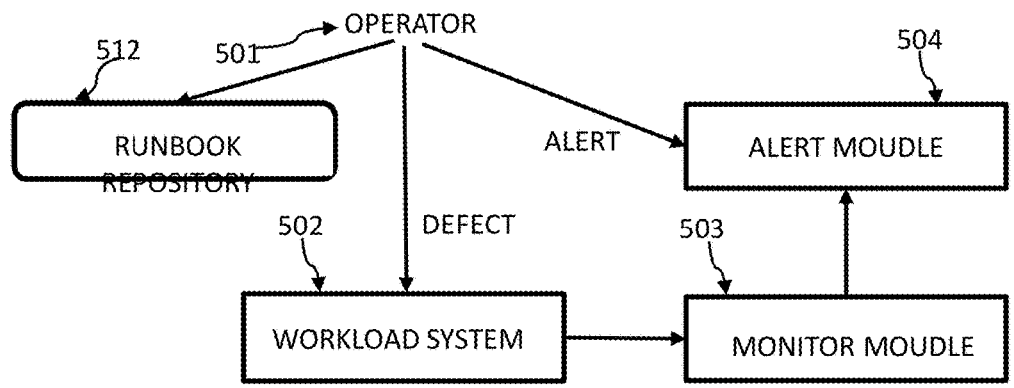
FIG. 5 depicts a schematic diagram of an environment for detecting out-of-date runbooks according to some embodiments of the present disclosure.

An example runbook may correspond to an alert, and the alert may be generated in response to a defect being detected in a workload system, such as an application 96 deployed in a cloud computing environment 50. FIG. 4 depicts one such example alert 401 in which a link 402 of a runbook is included according to some embodiments of the present disclosure. FIG. 5 depicts a schematic diagram of an example environment 500 for detecting out-of-date runbooks according to some embodiments of the present disclosure. Referring FIGS. 4 and 5, developers who developed a workload system 502 (such as an application running in a cloud computing environment) may have defined alerts for defects of the workload system 502 and may also have provided runbooks corresponding to the respective alerts.

All runbooks may be stored in a runbook repository 520. When the workload system 502 runs in the environment 500, a defect in the workload system 502 may be detected by a monitor module 503 in the environment 500 and an alert module 504 in the environment 500 may present an alert, such as the alert 401, to an operator 501 based on the detected defect. If the operator 501 accesses the link 402 of the runbook (as indicated in block 403), the runbook including contents describing operations for fixing the defect, e.g., Resync Instruction 404, will be obtained by the operator 501. Then, the operator 501 may fix the defect according to the contents included in the Resync Instruction 404.

In this way, runbooks may include useful information and properties for both developers and operators of a workload system. However, with rapid development and deployment for a workload system (such as in a cloud computing agile development environment), runbooks can become out-of-date frequently. As a result, even a developer who is familiar with the workload system may not be able to determine whether he/she has updated all related runbooks after changing the workload system. It occurs quite often that, when a runbook is used, it is out-of-date. For example, referring back to FIGS. 4 and 5, when the operator 501 attempts to fix the defect according to the descriptive operations included in the Resync Instruction 404, because a tool related to the command 405 has been upgraded, the command 405 may not be the correct way to fix the problem. The operator 501 may then receive a message 406 after running the command 405 indicating that the command 405 is out-of-date. That is, the runbook is out-of-date. Experience has indicated that if the operator 501 has to apply every defect on the workload system 502 in order to detect all out-of-date runbooks, it is a painful and time-consuming job for the operator 501, especially in a situation where thousands of alerts have been defined in the workload system 502.

Therefore, one feature and advantage of some embodiments of the disclosure may include a method, a system, and a program product for automatically, and without user interaction, detecting out-of-date runbooks.

According to some embodiments of present disclosure, in order to detect out-of-date runbooks, an extended working environment of the workload system with a defect may be simulated, in which a defect corresponding to an alert predefined in the workload system by programmers can be simulated on the workload system. The defect may trigger the alert so that a runbook included in the alert can be analyzed automatically to determine whether or not it is out-of-date or not through automatic monitoring whether the associated defect can be fixed or not.

Figure 6:
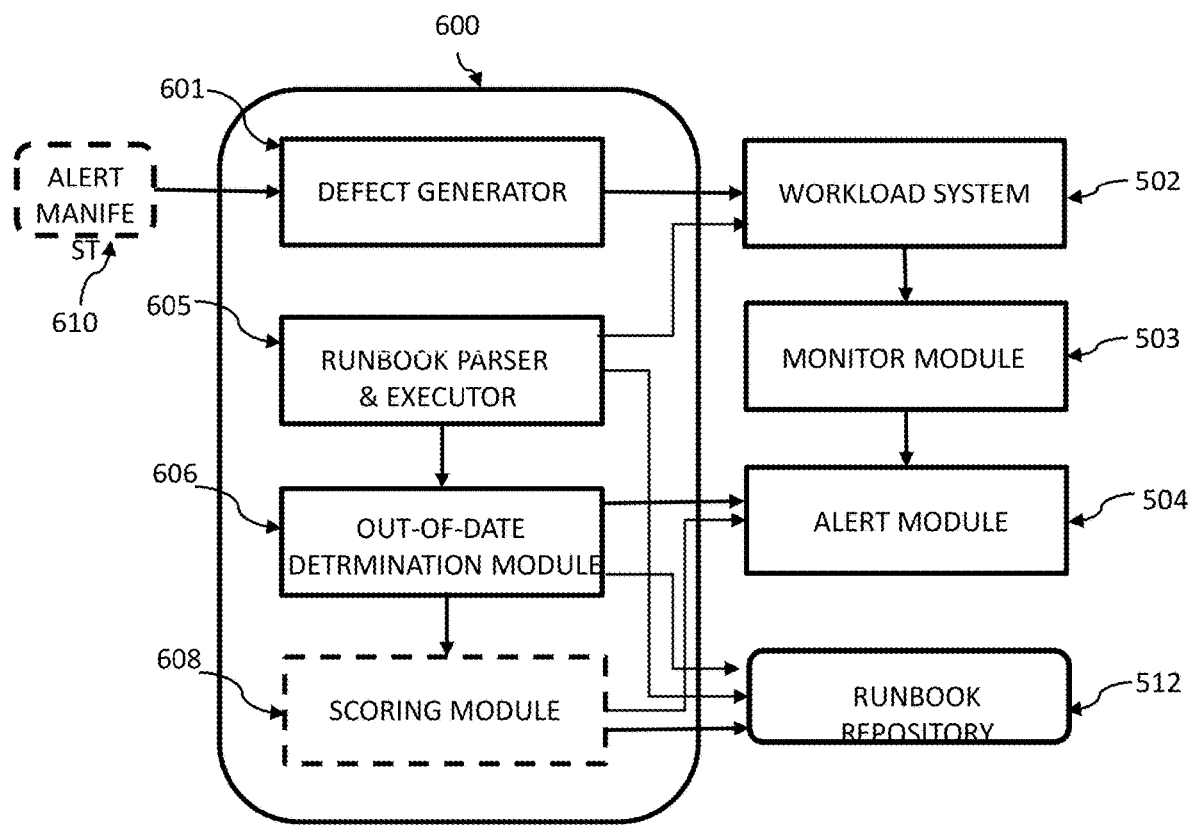
FIG. 6 depicts a schematic diagram of an example environment for detecting out-of-date runbooks, in which a runbook out-of-date detection system is included according to some embodiments of this disclosure.

FIG. 6 depicts a schematic diagram of an example environment 600 for detecting out-of-date runbooks, in which a runbook out-of-date detection system 620 is included consistent with some embodiments of the present disclosure. Referring to FIG. 6, the runbook out-of-date detection system 620 may include a defect generator 601, a runbook parser & executor 605, and an out-of-date determination module 606. The runbook out-of-date detection system 620 may communicate with the workload system 502, the monitor module 503, the alert module 504 and the runbook repository 520 depicted in FIG. 5.

In the runbook repository 520, some runbooks may include descriptive operations that can be parsed into executable operations by a software nodule. Other runbooks may only include descriptions that are not executable by a software module. The alerts, which correspond to the runbooks with executable operations by a software module, may be managed by an alert manifest 610. Mappings between respective alerts and respective defects may be included in the alert manifest 610. The alert manifest 610 may also include a declaration on how to generate a defect on the running workload system 502 for a corresponding alert.

The defect generator 601, after reading the alert manifest 610, may automatically generate a defect corresponding to an alert on the running workload system 502 based on its corresponding declaration in the alert manifest 610. The defect corresponding to the alert, in turn, may be automatically generated using chaos-mesh, litmus, KubeInvader to simulate network attack, disk usage high, JO error and memory leak, etc., technologies in some embodiments.

The existing monitor module 503 may detect the defect on the running workload system 502 and the existing alert module 504 may automatically present an alert based on the monitored defect. The runbook parser & executor 605 may automatically detect whether or not there is an alert from the existing alert module 504. Once the runbook parser & executor 605 automatically detects the alert corresponding to the defect in the running workload 502, the runbook parser & executor 605 may automatically obtain information of the alert, where the information of the alert includes an identification of a runbook. Then, the runbook parser & executor 605 may automatically obtain the identification of a runbook based on information of the alert and may then automatically access the runbook based on the identification of the runbook, where the runbook includes contents describing operations for fixing the defect. Next, the runbook parser & executor 605 may automatically parse the contents to obtain executable operations and then automatically execute the executable operations on the running workload system 502.

The existing monitor module 503 and alert module 504 may work together to automatically provide rough status of an alert of the running workload system 502. For example, if a defect corresponding to an alert is not fixed, the rough status of the alert may be "not solved", and if the defect corresponding to the alert is fixed, the rough status of the alert may be "solved". By referring to the rough status of an alert, if the descriptive operations in a runbook corresponding to the alert are not out-of-date, i.e., the runbook is not out-of-date, a defect corresponding to the alert in the running workload system 502 can be fixed, then rough status of the alert provided by the alert module 504 may be changed to "solved" after a predefined period. But, if the descriptive operations are out-of-date, i.e., the runbook is out-of-date, the defect corresponding to the alert in the running workload system 502 cannot be fixed, then the rough status of the alert presented by the alert module 504 may still be kept as "not solved" after the predefined period. So, the rough status of the alert may be used to automatically determine whether or not the corresponding runbook is out-of-date. Thus, the out-of-date determination module 606 may automatically detect whether the alert is solved on the running workload system 502 after the predefined period. Once the out-of-date determination module 606 automatically detects the alert is not solved on the running workload system 502 after the predefined period, the out-of-date determination module 606 may automatically determine that the runbook is out-of-date; otherwise, the out-of-date determination module 606 may automatically determine that the runbook is not out-of-date. The predefined period may be defined by developers or operators.

In some embodiments, the runbook out-of-date detection system 620 may further include a scoring module 607 for automatically scoring a runbook. In order to describe example operations of the scoring module 607, the existing monitor module 503 and alert module 504 need to work together to further provide a more detailed status of solving an alert for corresponding defect on the running workload system 502 using existing technologies. For example, if a defect relates to memory usage, when the memory usage is more than 60%, an alert corresponding to the defect may be generated. If the defect corresponding to the alert is not fixed, the rough status of the alert may be "not solved", but the existing monitor module 503 and alert module 504 may work together to further provide a status of solving the alert, such as detailed memory usage information after the runbook parser & executor 605 applies the corresponding runbook on the running workload system 502.

In some embodiments, if the out-of-date determination module 606 automatically determines that the runbook is out-of-date, the scoring module 607 may automatically obtain the status of solving the alert for the defect on the running workload system 502 and then automatically score the runbook based on the status of solving the alert. For example, if the memory usage is changed from 85% to 70% after the runbook parser & executor 605 applies the corresponding runbook, the scoring module 607 may automatically score the runbook as 1−(0.85−0.7)/0.85=0.824. In other words, the runbook has improved 82.4% of the defect in this example embodiment. It would be appreciated, however, that other scoring methods may be applied by the scoring module 607. The calculated score of the runbook may be automatically stored together with the runbook in the runbook repository 520.

In some embodiments, if the out-of-date determination module 606 determines that the runbook is not out-of-date, the scoring module 607 may automatically score the runbook as "1", the highest score, which means the runbook has fixed 100% of the defect.

In some embodiments, when the out-of-date determination module 606 determines that a runbook is out-of-date, the out-of-date determination module 606 may automatically search for an alternative runbook corresponding to the defect from the runbook repository 520 based on the information in the alert, and if the alternative runbook is searched out from the runbook repository 520, the out-of-date determination module 606 may automatically recommend the alternative runbook to the developers/operators. For example, the out-of-date determination module 606 may automatically determine the name of the alert from the runbook parser & executor 605, and automatically search the runbook repository 520 for an alternative runbook for the defect using the name of the alert as a keyword. If more than one runbooks are found, the runbook with the highest score and/or with the score more than a predefined threshold may be determined to be the alternative runbook. For example, three runbooks are found with scores 0.6. 0.7 and 0.8, if the predefined threshold is 0.75, the third runbook may be recommended as the alternative runbook. But, if the predefined threshold is 0.85, the out-of-date determination module 606 may automatically determine that no alternative runbook is found from the runbook repository. Then, the out-of-date determination module 606 may automatically generate a runbook job in the runbook repository for creating a runbook corresponding to the alert. Then, developers can find the runbook job so as to solve it.

The example runbook out-of-date detection system 620, together with the workload system 502, the monitor module 503, the alert module 504, and the runbook repository 520, may be comprised in any computer system. In some embodiments, the example runbook out-of-date detection system 620, together with the workload system 502, the monitor module 503, the alert module 504, and the runbook repository 520, may be comprised in a cloud computing environment, and the defect generator 601, the workload system 502, the runbook parser & executor 605, the out-of-date determination module 606 and the scoring module 607, the monitor module 503, and the alert module 504 may run in respective containers in the cloud computing environment.

In some embodiments, the runbook parser & executor 605, the out-of-date determination module 606, and the scoring module 607 may be merged as a single module to implement all functions of these three modules.

Figure 7:
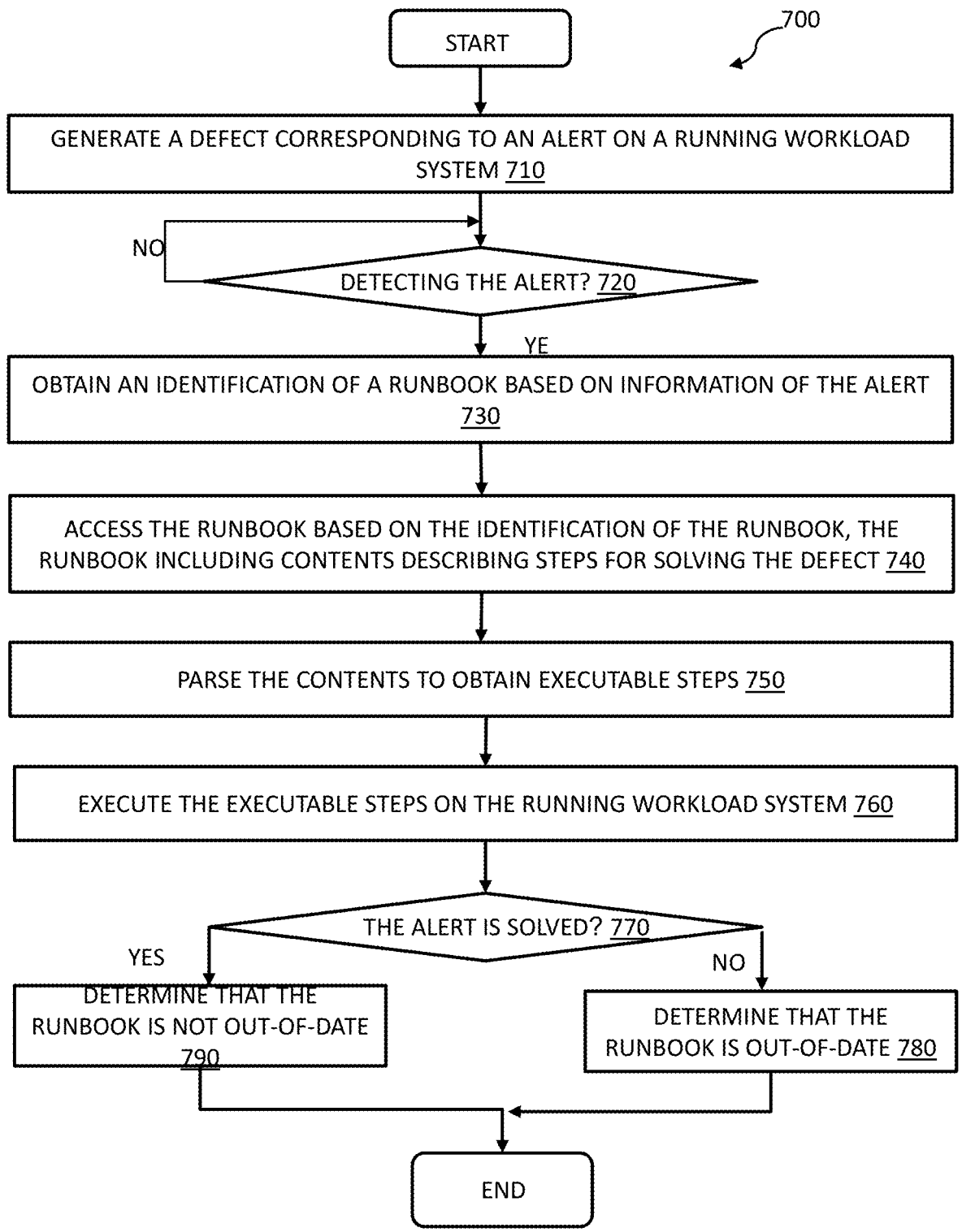
FIG. 7 depicts a flowchart of an example method for detecting out-of-date runbooks according to some embodiments of the present disclosure.

FIG. 7 depicts a flowchart of an example method 700 for detecting out-of-date runbooks according to some embodiments of the present disclosure. The method 700 may be implemented by the runbook out-of-date detection system 620, or other suitable computer/computing systems. For ease of understanding, the method 700 will be described with reference to FIG. 6.

At operation 710, the runbook out-of-date detection system 620 may generate a defect corresponding to an alert on a running workload system, such as the workload system 502. In some embodiments, the runbook out-of-date detection system 620 may read corresponding declaration of the alert from an alert manifest first, where the alert corresponds to the runbook. Then, the runbook out-of-date detection system 620 may generate the defect on the running workload system 502 based on the corresponding declaration of the alert.

At operation 720, the runbook out-of-date detection system 620 may detect whether or not there is an alert from the existing alert module 504.

At operation 730, in response to detecting the alert corresponding to the defect in the running workload system 502, the runbook out-of-date detection system 620 may obtain an identification of a runbook based on information of the alert.

At operation 740, the runbook out-of-date detection system 620 may access the runbook based on the identification of the runbook, where the runbook includes contents describing operations for fixing the defect.

At operation 750, the runbook out-of-date detection system 620 may parse the contents to obtain executable operations.

At operation 760, the runbook out-of-date detection system 620 may execute the executable operations on the running workload system 502.

At operation 770, the runbook out-of-date detection system 620 may determine whether the alert is solved.

At operation 780, in response to detecting that the alert is not solved on the running workload system 502 after a predefined period, the runbook out-of-date detection system 620 may determine that the runbook is out-of-date, and in response, generate and transmit a runbook out-of-date signal. Then, the process may end.

At operation 790, in response to detecting that the alert is solved on the running workload system 502 after the predefined period, the runbook out-of-date detection system 620 may determine that the runbook is not out-of-date. Then, the process may end.

In some embodiments, in response to the runbook out-of-date signal (e.g., after determining the runbook is out-of-date), the runbook out-of-date detection system 620 may obtain a status of solving the alert for the defect in the running workload system 502 and score the runbook based on the status of solving the alert.

In some embodiments, in response to the runbook out-of-date signal (e.g., after determining the runbook is out-of-date), the runbook out-of-date detection system 620 may search the runbook repository 520 for an alternative runbook for the defect based on the information in the alert. If the alternative runbook is searched out from the runbook repository 520, the runbook out-of-date detection system 620 may recommend the alternative runbook. In some embodiments, if the runbook out-of-date detection system 620 cannot search out an alternative runbook from the runbook repository 520, the runbook out-of-date detection system 620 may generate a runbook job in the runbook repository 520 for creating an updated runbook corresponding to the alert, so as developers and/or operators may aware the issue.

It should be noted that the method 700 of detecting out-of-date runbooks according to embodiments of the present disclosure may be implemented by computer system/server 12 of FIG. 1. It also should be noted that the method 700 of detecting out-of-date runbooks according to embodiments of the present disclosure may be implemented in any computer system. In some embodiments, the method 700 may be implemented in a cloud computing environment, and respective operation in the method 700 may be implemented in respective containers/POD in the cloud computing environment.

The present disclosure may be a system, a method, and/or a computer program product at any possible technical detail level of integration. The computer program product may include a tangible computer readable storage medium (or media) having computer readable program instructions thereon for causing a processor to carry out aspects of the present disclosure.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device may receive computer readable program instructions from the network and may forward the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which may execute via the processor of the computer or other programmable data processing apparatus to implement the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions that implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more computer executable instructions for implementing the specified logical function(s). In some alternative implementations, the functions noted in the blocks may occur out of the order noted in the Figures. For example, two blocks shown in succession may, in fact, be accomplished as one operation, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
  generating, by one or more processing units, a defect corresponding to an alert on a running workload system; and
  in response to generating the defect in the running workload system:
    automatically obtaining, by the one or more processing units, an identification of a runbook based on information of the alert;
    automatically accessing, by the one or more processing units, the runbook based on the identification of the runbook, the runbook including instructions for fixing the defect;
    automatically parsing, by the one or more processing units, the instructions to obtain executable operations;

automatically executing, by the one or more processing units, the executable operations on the running workload system; and in response to detecting that the alert is not solved on the running workload system after a predefined period:

automatically determining, by the one or more processing units, that the runbook is out-of-date; and automatically generating, by the one or more processing units, a runbook out-of-date signal, wherein the generating the defect corresponding to the alert on the running workload system comprises: automatically reading, by the one or more processing units, corresponding declaration of the alert from an alert manifest and automatically generating, by the one or more processing units, the defect on the running workload system based on the corresponding declaration of the alert.

2. The method of claim 1, further comprising, in response to detecting that the alert is solved on the running workload system after the predefined period, automatically determining, by the one or more processing units, that the runbook is not out-of-date.

3. The method of claim 1, further comprising, in response to the runbook out-of-date signal:

automatically obtaining, by the one or more processing units, a status of solving the alert on the running workload system; and automatically scoring, by the one or more processing units, the runbook based on the status of solving the alert.

4. The method of claim 1, further comprising, in response to the runbook out-of-date signal:

automatically searching, by the one or more processing units, a runbook repository for an alternative runbook for the defect based on the information of the alert; and in response to the automatic searching indicating an alternative runbook is searched out, automatically recommending, by the one or more processing units, the alternative runbook.

5. The method of claim 4, further comprising, in response to the automatic searching indicating no alternative runbook is searched out, automatically generating, by the one or more processing units, a runbook job in the runbook repository for creating an updated runbook corresponding to the alert.

6. The method of claim 1, wherein the method is implemented in a cloud computing environment, and respective operations of the method are implemented in respective containers in the cloud computing environment.

7. A system, comprising:
at least one processing unit; and
a memory coupled to the at least one processing unit and storing instructions thereon, wherein the instructions, when executed by the at least one processing unit, cause the processing unit to:

detect an alert on a running workload system; and in response to detecting the alert in the running workload system:

obtain an identification of a runbook based on information of the alert;

access the runbook based on the identification of the runbook, the runbook including contents describing operations for fixing the defect;

parse the contents to obtain executable operations;

execute the executable operations on the running workload system; and in response to detecting that the alert is not solved on the running workload system after a predefined period, determine that the runbook is out-of-date, wherein the generating the defect corresponding to the alert on the running workload system comprises: reading corresponding declaration of the alert from an alert manifest; and generating the defect on the running workload system based on the corresponding declaration of the alert.

8. The system of claim 7, further comprising instructions to, in response to detecting that the alert is solved on the running workload system after a predefined period, determine that the runbook is not out-of-date.

9. The system of claim 7, further comprising instructions to, in response to determining the runbook is out-of-date:

obtain a status of solving the alert on the running workload system; and score the runbook based on the status of solving the alert.

10. The system of claim 7, further comprising instructions to, in response to determining the runbook is out-of-date:

search a runbook repository for an alternative runbook for the defect based on the information of the alert; and in response to the searching indicating the alternative runbook is searched out, recommend the alternative runbook.

11. The system of claim 10, further comprising instructions to, in response to the searching indicating no alternative runbook is searched out, generate a runbook job in the runbook repository for creating a new runbook corresponding to the alert.

12. The system of claim 7, wherein the operations are implemented in containers in a cloud computing environment.

13. A computer program product, comprising a computer-readable storage medium having program instructions embodied therewith, the program instructions executable by a first component with at least one processing unit in a cloud computing environment to cause the at least one processing unit to perform operations, including:

generating a defect corresponding to an alert on a running workload system; and in response to generating the defect:

obtaining an identification of a runbook based on information of the alert;

accessing the runbook based on the identification of the runbook, the runbook including contents describing operations for fixing the defect;

parsing the contents to obtain executable operations;

executing the executable operations on the running workload system; and in response to detecting that the alert is not solved on the running workload system after a predefined period, determining that the runbook is out-of-date, wherein the generating the defect corresponding to the alert on the running workload system comprises: reading corresponding declaration of the alert from an alert manifest and generating the defect on the running workload system based on the corresponding declaration of the alert.

14. The computer program product of claim 13, wherein the operations further include, in response to detecting that the alert is solved on the running workload system after a predefined period, determining that the runbook is not out-of-date.

15. The computer program product of claim 13, wherein the operations further include, in response to determining the runbook is out-of-date:

obtaining a status of solving the alert on the running workload system; and scoring the runbook based on the status of solving the alert.

16. The computer program product of claim 13, wherein the operations further include:
   in response to determining the runbook is out-of-date, searching a runbook repository for an alternative runbook for the defect based on the information of the alert;
   in response to the searching indicating the alternative runbook is searched out, recommending the alternative runbook; and
   in response to the searching indicating no alternative runbook is searched out, generating a runbook job in the runbook repository for creating a new runbook corresponding to the alert.

17. The computer program product of claim 13, wherein the program instructions are implemented in a cloud computing environment, and wherein the operations are implemented in containers in the cloud computing environment.

* * * * *